United States Patent [19]
Lohrberg

[11] Patent Number: 6,110,334
[45] Date of Patent: Aug. 29, 2000

[54] ELECTROLYTE CELL

[76] Inventor: Karl Lohrberg, Breslauerstrasse 1, 63150 Heusenstamm, Germany

[21] Appl. No.: 09/077,823
[22] PCT Filed: Oct. 15, 1996
[86] PCT No.: PCT/EP96/04477
§ 371 Date: Jun. 4, 1998
§ 102(e) Date: Jun. 4, 1998
[87] PCT Pub. No.: WO97/20966
PCT Pub. Date: Jun. 12, 1997

[30] Foreign Application Priority Data

Dec. 5, 1995 [DE] Germany ............... 195 45 332

[51] Int. Cl.[7] ...................................... C25B 9/00
[52] U.S. Cl. ................. 204/256; 204/268; 204/283; 204/290 R
[58] Field of Search ............... 204/255, 256, 204/258, 268, 270, 283, 290 R

[56] References Cited

U.S. PATENT DOCUMENTS 4,728,409  3/1988  Oloman ..................... 204/256
5,358,609  10/1994  Drackett .................... 204/84

Primary Examiner—Kathryn Gorgos
Assistant Examiner—Thomas H Parsons
Attorney, Agent, or Firm—Wenderoth, Lind & Ponack, L.L.P.

[57] ABSTRACT

The invention relates to an electrolyte cell with an end anode and an end cathode and bipolar cell elements disposed between outer cell elements comprising these and electrically connected with them and connected in series one with the other, wherein each cell element comprises one or two gas diffusion electrode(s) of which one forms simultaneously the ceiling of the subjacent electrolyte chamber and the floor of the superjacent electrolyte chamber and the end anode and the anodes of the bipolar cell elements comprise a perforated, electrically well-conducting electrode structure, wherein each electrolyte chamber is charged with electrolyte and reaction gas, such as oxygen, and a particular mixture of electrolyte and the resulting product as well as residual reaction gas are drawn off from each electrolyte chamber, wherein the cell elements are combined in the form of a stack, that [sic] the end cathode and the cathodes of the bipolar cell elements comprise a perforated, electrically well-conducting support wall on which rests in each instance one gas diffusion electrode, and that [sic] the overflows provided at the particular upper cell elements are adjustable with respect to height.

17 Claims, 2 Drawing Sheets

MULTI-ELECTROLYSIS IN STACKWISE STRUCTURE WITH GAS DIFFUSION ELECTRODE

MULTI-ELECTROLYSIS IN STACKWISE STRUCTURE WITH GAS DIFFUSION ELECTRODE

BIPOLAR ELEMENT

MULTI-ELECTROLYSIS IN STACKWISE STRUCTURE WITH GAS DIFFUSION ELECTRODE, CONNECTED AS A FUEL CELL

ELECTROLYTE CELL

BACKGROUND OF THE INVENTION

The invention relates to an electrolyte cell with an end anode and an end cathode and cell elements disposed between outer cell elements comprising these and electrically connected to them and connected in series with one another, wherein each cell element comprises one or two gas diffusion electrode(s), of which one forms simultaneously the ceiling of the subjacent electrolyte chamber and the floor of the superjacent electrolyte chamber as well as the end cathode and the anodes of the bipolar cell elements comprise a perforated, electrically well-conducting electrode structure, for example of nickel, wherein each electrolyte chamber is charged with electrolyte and reaction gas, such as oxygen, for example in the form of air, and a particular mixture of electrolyte and the resulting product as well as residual reaction gas is drawn off from each electrolyte chamber. Such an electrolyte cell has for example been suggested for the generation of ammonium polysulfide (APS) to which as the electrolyte is supplied an aqueous ammonium sulfide solution and from which is drawn off a solution comprising ammonium polysulfide. The electrolyte cell comprises an anode, a gas diffusion cathode and an electrolyte chamber disposed between the anode and the cathode. The cathode comprises an electrically conducting, gas-permeable carbon layer against which flows the gas comprising free oxygen and which is in contact with the electrolyte. Gas containing free oxygen is conducted into the electrolyte chamber and hyperoxide anions (OOHO—) are formed in it. From the electrolyte chamber are drawn off a solution containing ammonium polysulfide and a residual gas. Associated with the cathode is an areal, permeable metal element, for example a metal mesh or expanded metal, to which is connected a carbon layer. The carbon layer can be a carbon cloth coated with a mixture of graphite and PTF particles.

The use of a carbon cloth in gas diffusion electrodes is problematic in all application cases for the following reasons: into the gas diffusion electrode gas must diffuse, i.e. it must be porous. On the other hand, it is necessary to prevent gas from penetrating through the gas diffusion electrode since the desired reactions take place only on the surface of the electrolyte within the gas diffusion electrode. This means that fluid must also diffuse into the electrode. In the case of fuel cells this problem has been attempted to be solved thereby that the electrolyte was immobilized, i.e. a cloth or a felt was impregnated with the electrolyte. Thus, in each instance two porous cloths, namely for example the felt impregnated with the electrolyte and the gas diffusion electrode, are opposing one another in pressing contact with each moistening the other one, but not permitting penetration of the fluid.

In electrolyte processes in which substances dissolved in the electrolyte are to be converted and in which the solubility of the substances is limited, immobilizing the electrolyte is not possible. In the electrolytic generation of $H_2O_2$ in an alkaline electrolyte, for example, the throughput of sodium hydroxide is determined by the solubility of $Na_2O_2$ in the sodium hydroxide. If the carbon cloth on the side facing the fluid is made hydrophilic, and, on the side facing the gas, is made hydrophobic by impregnating the side facing the gas with PTFE, the electrolyte can penetrate up to the hydrophobic layer in the gas diffusion electrode. The gas can penetrate into the hydrophobic portion up to the hydrophilic portion filled with electrolyte. The reaction takes place at the boundary layer in the pores of the, overall, porous cloth. Due to differing capillary forces of the two different layers, however, the separating force is not unlimited. It is in general approximately 0.025 bar. However this also means that at a density of the electrolyte of 1 $g/cm^3$ the height of one electrode is limited to 25 cm. This means further that the pressure difference in the reaction volumes can also not be greater than 0.025 bar. If it were greater, the gas would bubble through the upper portion of the perpendicular cloth. If it were less or if the electrolyte pressure were higher, the electrolyte would penetrate through the lower portion. In both cases the gas diffusion electrode would be inactive in these areas. In addition, capillary forces are a function of the adhesion of the fluid. Thus the electrolyte would demand a different level at each temperature. This, however, impairs the large-scale industrial application of this technology, in particular in extractive metallurgy. In the extraction of metals, the electrodes are, as a rule, taller than one meter. Flooding the gas diffusion electrode could for example only be avoided thereby that the metal extraction electrolysis is operated in vacuo such that electrolytes penetrating through the gas diffusion electrode are drawn off at the bottom from the electrolyte cell, for which additional expenditures are required.

Another possible solution of this problem comprises placing the electrodes horizontally. However, this cannot be realized in electrolyses for extracting metals since in this case open electrolyzer are used, from which metal in the form of solid cathode deposits must be removed at regular intervals.

Such an approach would, incidentally, fail for economic reasons. Horizontal cells are monopolar cells. Therefore, a multiplicity of cells would need to be electrically connected in series, such as, for example, in the case of the so-called mercury cell for generating chlorine and sodium hydroxide. In the present case this fails due to the current density which is far too low in gas diffusion electrodes. Due to their porosity the exchange of material is limited. As the limit of current density are generally considered 2 $kA/m^2$. In mercury electrolyses for chlorine generation, in contrast, it is possible to work with current densities up to 15 $kA/m^2$. At an equivalent production, the required area would thus increase by a multiple. For this reason, monopolar cells for large-scale industrial processes are in general equipped with vertical electrodes.

It is the task of the present invention to eliminate in an electrolyte cell of the above cited type the described disadvantages and to ensure reliable and continuous application at high efficiency.

This task is solved according to the invention for example thereby that the cell elements are combined in the form of a stack, that the end cathode and the cathodes of the bipolar cell elements comprise a perforated, electrically well-conducting support wall, for example of nickel, on which is disposed in each instance one gas diffusion electrode, and that the overflows provided at the cell elements are adjustable with respect to their height.

In this way it is possible to ensure that at no site of the electrolyte cell a hydrostatic pressure occurs which is higher than the penetration resistance of the gas diffusion electrode, implemented for example as a carbon cloth. The difference of the hydrostatic pressure from the penetration resistance of the gas diffusion electrolysis [electrode] can be such that, for example, the reaction gas flows sequentially through the cell elements at decreasing pressure. Such an interconnection contributes to the greater utilization of the gas. The stack of bipolar cells have a minimum space requirement; the number of superjacent cell elements is virtually unlimited. The required pipe lines are short. Due to the bipolar arrangement it is not necessary to use bus bars between the cell elements although the cell elements are electrically connected in series. Due to this interconnection the necessary electric energy is required at low current strength and high voltage which makes the transformers and rectifiers used cost-effective.

Due to the gas diffusion electrode, the invented electrolyte cell is primarily intended for the chemical conversion of oxygen at the surface of the aqueous electrolyte, to which is applied a voltage from the outside. The selectivity and the strength of the oxidation energy at the gas diffusion electrode can be set by means of the selection of suitable electrolytes but also by means of different catalysts, for example through platinum.

As such, the electrolyte cell can serve for example also as a fuel cell for generating energy if to both polarities gases reacting with each other are supplied from the outside. In contrast to conventional fuel cells, the value created is comprised in the reaction product generated. If oxygen generated at the anode is converted with hydrogen supplied from the outside, the electrolyte cell constructed in this way serves for decreasing the voltage and thus to save high-cost electric energy.

This is of interest especially if anodes with high oxygen overpressure can be replaced by gas diffusion electrodes. This applies, for example, to the electrolytic generation of metals with special emphasis on Zn and Cu. The invented electrolyte cell is preferably applied for the electrolytic generation of $H_2O_2$ by oxidation of the $H_2$ generated at the cathode with relatively complicated processes occurring in alkaline solution with $O_2$ With a catalyst-free gas diffusion electrode the energy saving is approximately 0.6 V, the heat of formation of $Na_2O_2$, which forms in alkaline solution, correspondingly approximately 450 kWh/t $H_2O_2$.

A further technical application comprises the so-called Hydrina process in which $Na_2SO_4$, which accumulates in large quantities as a neutralization product of $H_2SO_4$ and NaOH, is again split into its starting products in the electrolysis. When using a gas diffusion electrode catalyzed with platinum as anode or as cathode and flow of $H_2$, respectively $O_2$, each over the electrode of opposite polarity, the following reaction equation results:

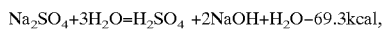

$$Na_2SO_4+3H_2O=H_2SO_4 +2NaOH+H_2O-69.3kcal,$$

i.e. the energy requirement is limited to the heat of neutralization of acid and base.

With the electrolyte cell according to the invention the principle of the redox processes can basically be applied to any reduction/oxidation wherein the desired potentials can be set by means of different catalysts in the gas diffusion electrode, whereby the particular desired reaction proceeds as preferred.

Especially useful embodiments of the electrolyte cell according to the invention are in the dependent claims.

Whenever the oxidized product at the cathode can be reduced again, it is recommended to separate the anodes from the opposing cathodes by means of a diaphragm.

The diaphragm can therein be a cloth or a fiber mixture drawn onto the anode by suction, but it can also be an ion exchange membrane.

For specific application cases, for example in the production of $H_2O_2$, the gas diffusion electrode can be free of catalyst.

For operation as a fuel cell, the anodes and the cathodes are advantageously covered with a gas diffusion electrode which is impregnated with the catalyst, and the cell elements are each divided by a gas-tight horizontal separating wall.

The particular cathode of the bipolar cell elements, in particular its electrode structure, can be connected via electrically conducting webs provided with penetration openings for gas, respectively gas and fluid, comprising for example nickel. When dividing the cell elements by a separating wall, a corresponding penetration opening is provided in the webs on each side of the separating wall.

To ensure economic construction of the electrolyte cell, the housings of the cell elements can be connected by means of edge flanges by interplacing electrically insulating seals such that they are gas- and fluid-tight.

Preferred functional operation results if the cell elements are connected in parallel with respect to the electrolytes. This operating manner is especially of advantage if low current strengths must be supplied in large quantities of electrolyte. This is for example the case when sterilizing water.

In the case of cell elements connected electrically and, with respect to the electrolytes, in series, preferably a particular mixture of electrolyte and the resulting product as well as reaction gas can be transferred from the electrolyte chamber of an upper cell element via connection lines to the electrolyte chamber of a lower cell element, and from the lowest cell element can be drawn off electrolyte and product and potentially residual reaction gas.

The connection lines associated with the overflows usefully terminate laterally in the particular lower cell element such that simple assembly is possible.

Further goals, characteristics, advantages and application feasibilities of the invention are evident in the following description of embodiment examples in conjunction with the drawing. All described and/or graphically depicted characteristics form by themselves or in any combination the subject matter of the invention even independently of their summary in the claims or their reference back.

BRIEF DESCRIPTION OF THE DRAWINGS

In the drawings:

FIG. 2 depicts schematically the detail of a bipolar cell element for a cell element stack for an electrolysis operation, and specifically FIG. 2a such a one without redox processes, and FIG. 2b one with redox processes, with a separating layer being provided on the anode.

FIG. 1 represents an electrolyte cell as a stack of bipolar cell elements E1 to E5 stacked one above the other. The different polarities are denoted by (+) for the anodes A1 to A4 and by (−) for the cathodes K2 to K5. The two end electrodes A1 (end anode) and K5 (end cathode) have naturally only one polarity. In the topmost cell element E1, air and sodium hydroxide (NaOH) are supplied via a supply line 1. Due to the single polarity in the cell element E1, only oxygen is formed. The anode A1 comprises an expanded (mesh) metal, a textile or perforated sheet metal comprising nickel or any other metal or material which has good electrical conductivity and is corrosion resistant under the given conditions. The anode A1 can be separated from the opposing cathode K2 by a diaphragm or a membrane 13 (cf. FIG. 2b and 3). This is recommended whenever the oxidized product can be reduced again at the cathode K2 to K5. The diaphragm 13 can be a cloth or a fiber mixture suctioned onto the anode A1 to A4 and burned in, or a porous thin plate comprising synthetic material basically only allowing the current to pass; the membrane must have ion exchange properties.

If, as described, via the supply line 1, air or air and oxygen are introduced into the cell element 1, these are mixed with the oxygen formed there and the resulting gas mixture is output via the connection line 2 to the cell element E2. In the cell element E2 two polarities obtain, namely the cathode K2 and the anode A2. The cathode K2 serves according to the invention simultaneously as the floor of the first cell element E1. Like the anodes A1 and A2, the cathode K2 comprises, for example, a nickel structure, on which rests the carbon cloth, which in this example is not impregnated with catalyst, to form a gas diffusion electrode 11. At the cathode K2 the $H_2$, which normally develops here, is converted by the $O_2$ present in the gas diffusion electrode 11 to $H_2O_2$ which is dissolved as $Na_2O_2$ in the NaOH used as electrolyte and moves together with it through the connection line 2 into the cell element E2.

Analogously, through the connection lines 3 and 4, the NaOH becoming enriched with $Na_2O_2$ on its path downwardly, together with the air being slowly depleted of $O_2$, enters the cell elements E3 and E4, which is exited via the output line 5.

In cell element E5, $Na_2O_2$ is formed for the last time so that the electrolyte, comprising NaOH containing $Na_2O_2$, can here be separated. But it can also be introduced together with the mixture of $O_2$ and $N_2$ through a feedback line 6 into the cell element E5. $O_2$ serves in the cell element E5 for the purpose of ensuring that $Na_2O_2$ can still be formed in cell element E5.

$N_2$ and residual $O_2$ leave the system through the output line 7.

The level of the electrolyte lastly borne by the carbon cloth can be adjusted in any desired way by means of the disposition of the overflows 12 of the connection lines 2 to 4, respectively the output line 5. Likewise, by means of the lateral supply of the electrolyte the interval of the two electrodes A1 to A4 and K2 to K5 is not affected. Therewith, in order to keep the voltage drop, and thus the energy consumption, to a minimum, the mechanically and flow-technologically least possible distance of the two electrodes from one another can be set. This ensures that a hydrostatic pressure higher than the penetration resistance of the carbon cloths cannot occur at any site of the system.

The stack of bipolar cell elements E1 to E5 has a minimum space requirement since the number of superjacent cell elements E1 to E5 is virtually unlimited. The pipe lines are short. Due to the bipolar arrangement bus bars are not required between the cell elements E1 to E5 although the cell elements E1 to E5 are electrically connected in series. Due to this interconnection the necessary electric energy is required at low current and high voltage which makes transformers and rectifiers cost-effective.

Figure 3:
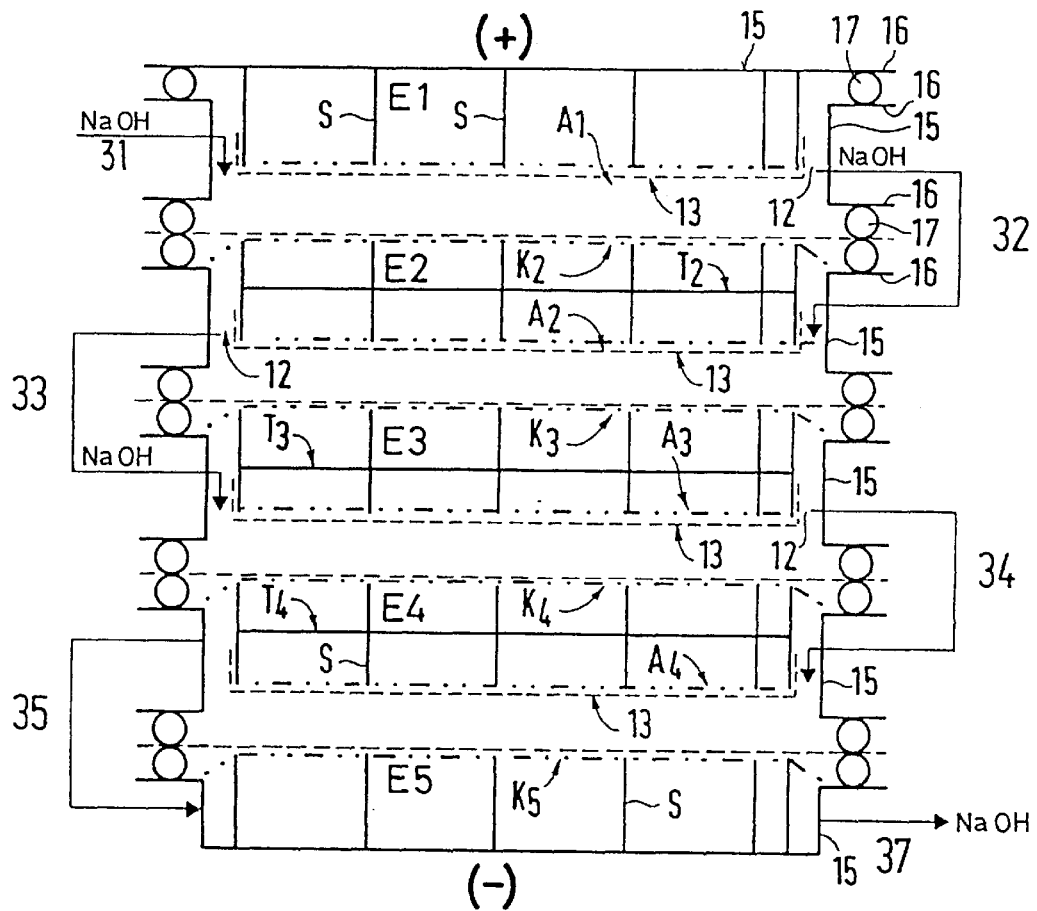
FIG. 3 depicts a schematic representation similar to that of FIG. 1, however modified for the operation of the electrolyte cell as a fuel cell.

In FIG. 3 is illustrated the operation of the electrolyte cell as a fuel cell. In this case the diaphragm 13 or the membrane of the anodes is replaced by a Pt-impregnated carbon cloth (FIG. 4); the carbon cloth at cathode K2 to K5 is also impregnated with Pt.

The electrolyte, in the present case NaOH, is supplied to the system via the supply line 31 and runs through the stack of cell elements E1 to E5 through the connection lines 32 to 35 and the output line 37. The overflows 12 of the electrolyte are set such that the anodes A1 to A4 with the gas diffusion electrode implemented as carbon cloth are only immersed; however, the carbon cloth is not penetrated.

To the anodes A1 to A4, $H_2$ is supplied from the outside through (not shown) pipe lines. In the electrolyte cell no longer is any oxygen formed but [rather] water. To the cathodes $O_2$ in the form of air or as such is also supplied to the system from the outside. In order to avoid internal mixing of the two gases $O_2$ and $H_2$, the bipolar cell elements E2 and E4 are divided gas-tight into two separate volumes by separating walls T2 to T4.

Figure 1:
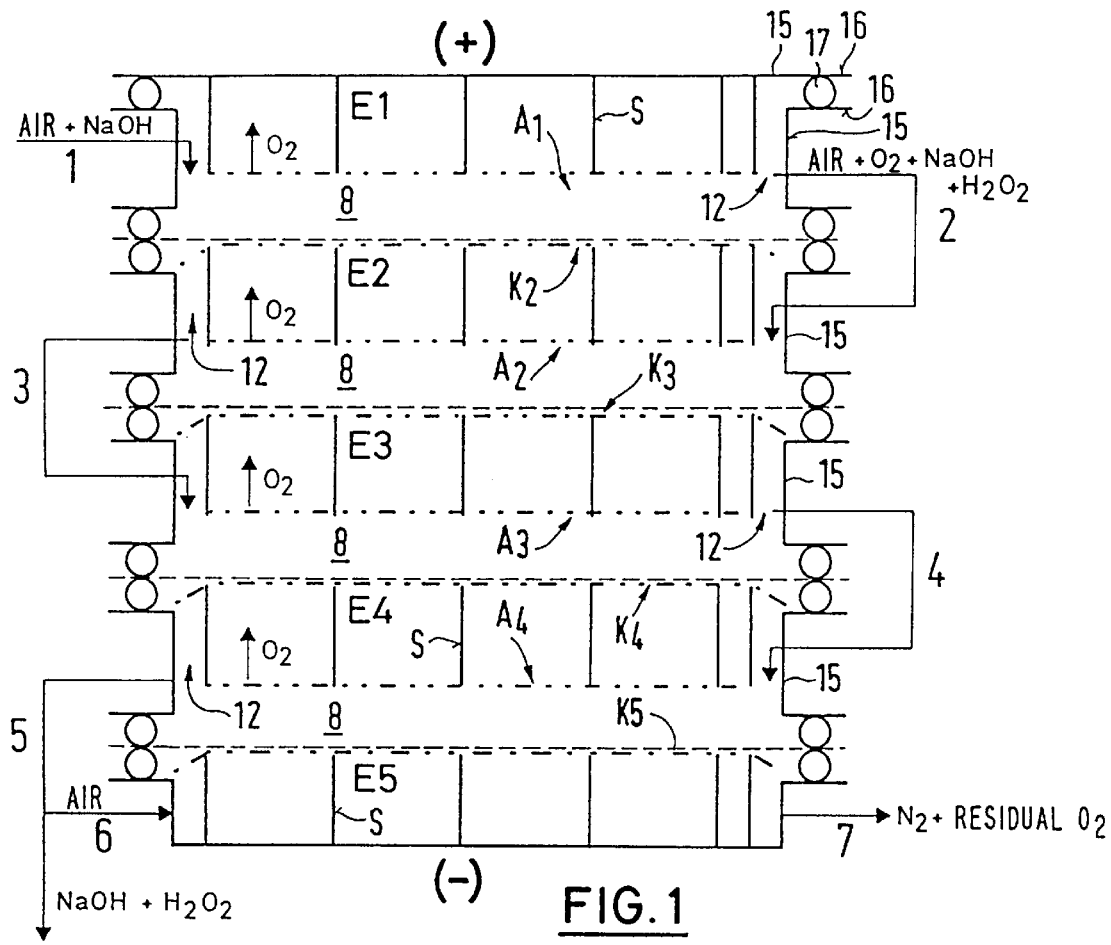
FIG. 1 depicts schematically the structure of an electrolyte cell according to the invention by example of the generation of $H_2O_2$.
Figure 2A:
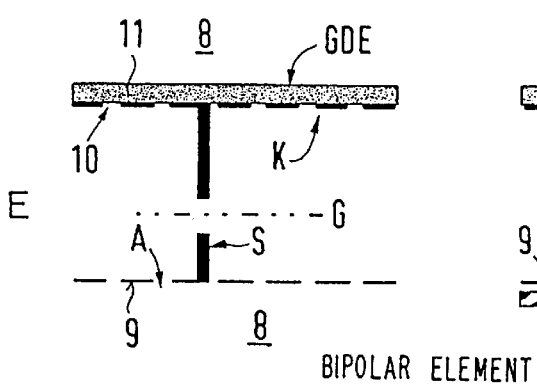
Figure 2B:
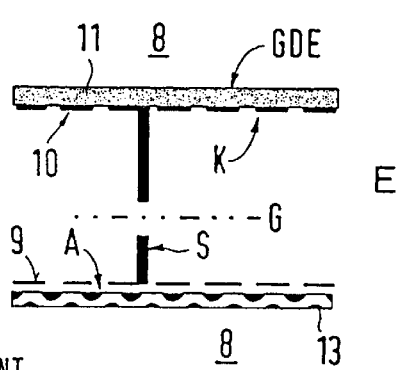

FIG. 2 illustrates the detail of a bipolar cell element E for an electrode stack according to FIG. 1 if operated as electrolysis without redox processes, i.e. without a separating layer on the anode A, in an enlarged detail. The electrode structure 9 of the anode A and the support wall 10 of cathode K are connected one with the other via conducting webs S, which, for example, in the case of $H_2O_2$ generation, comprise nickel. On cathode K rests a gas diffusion electrode (GDE) 11 comprising carbon cloth and is thus also connected with it so as to be conducting. Each web S is provided with at least one gas penetration opening G.

Figure 4:
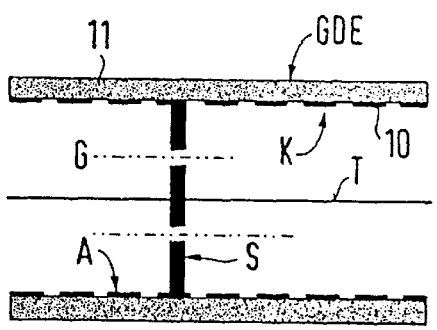
FIG. 4 depicts a representation similar to that of FIG. 2, however with the cell element being implemented for operating the electrolyte cell as a fuel cell.

FIG. 4 shows in a detail corresponding to FIG. 2 a bipolar cell element E for an electrode stack operating as a fuel cell. Both electrodes are covered with a gas diffusion electrode 14, respectively 11. Due to the separating wall T the connection [sic] webs S are provided on each side with a penetration opening G for gas.

The bipolar cell elements, in particular in this interconnection as fuel cell for generating electric energy, show significant advantages relative to prior art. In the known cells the electrolyte is immobilized. Without appropriate countermeasures the resulting water would dilute the electrolyte, flood the electrolyte volume and would disable its function. For this reason, the cells are operated at a temperature at which water evaporates from the electrolyte. But aqueous electrolytes most frequently comprise highly soluble, hygroscopic substances such as alkali liquors or phosphoric acids to conduct the current. During the evaporation of water, these show a corresponding increase of their boiling point, which lowers the partial pressure of the water above the electrolyte to below that of pure water. The operating temperature would have to be increased which, given the aggressive properties of the electrolytes, would entail material problems.

In order to avoid this, the partial pressure of the water in the fuel cell is decreased. This is accomplished thereby that the reaction gases $O_2$ and $H_2$ are not 100% utilized. The evaporation is converted into a vaporization. The heat of vaporization is a portion of the electric energy generated in the fuel cell, which is converted into heat through the internal resistance of the cell. A substantial portion of the internal resistance is caused by the resistance of the electrolyte, which, in turn, is substantially increased by means of the material for the immobilization of the same.

The conditions with the electrolyte cell according to the invention can be formed significantly more favorably. The quantity of the pumped-over electrolytes can be adjusted such that the generated water as well as also the generated heat can be taken up. Utilization, in particular of the hydrogen, can be increased. The internally generated quantity of heat to be considered as loss and the quantity of the generated water are uncoupled. This increases the flexibility of the operation of the cell since the quantity of water generated increases linearly with the power, however the internally generated quantity of heat [increases] as the square. The operating temperature of the electrolyte cell can be optimized according to its requirements. The necessary water evaporation can be moved to the outside into an evaporator laid out for this purpose and can potentially be carried out in multiple stages. The efficiency of the fuel cell is overall increased.

List of Reference Symbols

1 Supply line
2 Connection line
3 Connection line
4 Connection line
5 Output line
6 Feedback line
7 Output line
8 Electrolyte chambers
9 Electrode structure
10 Support wall
11 Gas diffusion electrode
12 Overflows
13 Diaphragms
14 Gas diffusion electrode
15 Housing
16 Edge flange
17 Seal
31 Supply line
32 Connection line
33 Connection line
34 Connection line
35 Connection line
37 Output line
A1 to A4 Anodes
E1 to E5 Cell elements
GK2 Gas penetration opening
to K5 Cathodes
S Conducing Webs
T2 to T4 Separating walls

I claim:

1. An electrolyte cell comprising:

a plurality of cell elements (E1 to E5) comprising a first external cell element (E1), a second external cell element (E5) and at least one bipolar cell element (E2 to E4);

said first external cell element (E1), said at least on bipolar cell element (E2 to E4), and said second external element (E5) being electrically connected in series and aligned in a stack, said first external cell element (E1) and said second external cell element (E5) being on opposit ends of said stack;

gas diffusion electrode (11) within each of said first external cell element (E1) and said second external cell element (E5), said gas diffusion electrode (11) in said first external cell element (E1) being an end anode (A1) comprising a perforated, conductive electrode structure (9) and said gas diffusion electrode (11) in said second external cell element (E5) being an end cathode (K5) comprising a perforated, conductive support wall (10).;

a plurality of gas diffusion electrodes (11) within each of said at least one bipolar cell element (E2 to E4), one of said plurality of gas diffusion electrodes (11) being an anode (A2 to A4) comprising a perforated, conductive electrode structure (9) and another of said plurality of gas diffusion electrodes (11) being a cathode (K2 to K4) comprising a perforated, conductive support wall (10);

a plurality of electrolyte chambers (8) formed between said gas diffusion electrode (11) of said first external cell element (E1), said plurality of gas diffusion electrodes (11) of said at leas one bipolar cell element (E2 to E4), and said gas diffusion electrode 911) of said second external cell element (E5), said plurality of electrolyte chambers (8) being charged with an electrolyte and a reaction gas, wherein a particular mixture of said electrolyte, resulting products and residual reaction gas is syphoned from said plurality of electrolyte chambers (8); and each of said at least on bipolar cell element (E2 to E4) and a top external cell element located on the top of said stack having an overflow (12) having an adjustable height, wherein said top external cell element being one of said first external cell element (E1) and said second external cell element (E5).

2. The electrolyte cell as claimed in claim 1, wherein said end anode (A1) and said anode (A2 to A4) are each separated from said cathode (K2 to K4) and said end cathode (K5), respectively, by a diaphragm (13) which comprises a gas-tight ion exchange membrane.

3. The electrolyte cell as claimed in claim 2, wherein each said diaphragm (13) is a mixture comprising one of cloth and fiber suctioned onto said anode (A2 to A4) and said end anode (A1) or a porous thin plate comprising synthetic material which allows only current to pass.

4. The electrolyte cell as claimed in claim 3, wherein said anode (A2 to A4), said end anode (A1), said cathode (K2 to K4) and said end cathode (K5) are impregnated with a catalyst, and said at least one bipolar cell element (E2 to E4) is divided by a gas-tight separating wall (T2 to T4).

5. The electrolyte cell as claimed in claim 1, wherein said gas diffusion electrode (11) and said plurality of gas diffusion electrodes (11) are free of a catalyst.

6. The electrolyte cell as claimed in claim 5, wherein said cathode (K2 to K4) and said anode (A2 to A4) of said at least one bipolar cell element (E2 to E4) are connected via electricall conducting webs (S) which have penetration opening (G) for at least one of gas and fluid.

7. The electrolyte cell as claimed in claim 6, wherein said at least one bipolar cell element (E2 to E4) is divided by a gas-tight separating wall (T2 to T4), and said penetration openings (G) are provided in said electrically conducting webs (S) on each side of said gas-tight separating wall (T2 to T4).

8. The electrolyte cell as claimed in claim 6, wherein said electrically conducting webs (S) comprise nickel.

9. The electrolyte cell as claimed in claim 1, wherein said anode (A2 to A4), said end anode (A1), said cathode (K2 to K4) and said end cathode (K5) are impregnated with a catalyst, and said at least one bipolar cell element (E2 to E4) is divided by a gas-tight separating wall (T2 to T4).

10. The electrolyte cell as claimed in claim 1, wherein said plurality of cell elements (E1 to E5) are contained in housings (15), said housing (15) are connected by edge flanges (16) and seal rings (17) are between said housings (15) such that said housings (15) are gas and fluid tight and also are electrically isolated.

11. The electrolyte cell as claimed in claim 1, wherein said cell elements (E1 to E5) are connected in parallel with respect to said electrolyte.

12. The electrolyte cell as claimed in claim 1, further comprising connection lines (2 to 6) to connect said cell elements (E1 to E5) to enable said particular mixture of said electrolyte, said resulting products and said residual reaction gas of an electrolyte chamber (8) of said plurality of electrolyte chambers (8) to be transferred to another electrolyte chamber (8) which is formed between a plurality of said at least one bipolar cell element (E2 to E4) or said at least one bipolar cell element (E2 to E4) and a bottom external cell element located on the bottom of said stack, said bottom external cell element being one of said first external cell element (E1) and sai second external cell element (E5), and to enable said particular mixture of said electrolyte, said resulting products and said residual reaction gas to be drawn off.

13. The electrolyte cell as claimed in claim 12, wherein said connection lines (2 to 6) terminate at a next lower cell element (E2 to E5) from which said connection lines (2 to 6) originated and each of said connection lines (2 to 6) is associated with said overflow (12) of said cell element from which it originated.

14. The electrolyte cell as claimed in claim 2, wherein said anode (A2 to A4), said end anode (A1), said cathode (K2 to K4) and said end cathode (K5) are impregnated with a catalyst, and said at least one bipolar cell element (E2 to E4) is divided by a gas-tight separating wall (T2 to T4).

15. The electrolyte cell as claimed in claim 1, wherein said perforated, conductive electrode structure (9) comprises nickel.

16. The electrolyte cell as claimed in claim 1, wherein said reaction gas comprises oxygen in the form of air.

17. The electrolyte cell as claimed in claim 1, wherein said perforated, conductive support wall (10) comprises nickel.

* * * * *